United States Patent [19] [11] 3,968,502
Shiozawa et al. [45] July 6, 1976

[54] ELECTRIC SHUTTER CIRCUIT
[75] Inventors: Kazuo Shiozawa, Hachioji; Junji Kajiwara, Kadoma, both of Japan
[73] Assignee: Konishiroku Photo Industry Co., Ltd., Tokyo, Japan
[22] Filed: July 23, 1974
[21] Appl. No.: 491,174

[30] Foreign Application Priority Data
July 26, 1973 Japan................................ 48-83667
Nov. 12, 1973 Japan.............................. 48-126334

[52] U.S. Cl.................................... 354/24; 354/50; 354/51; 354/60 R
[51] Int. Cl.².......................................... G03B 7/08
[58] Field of Search................ 354/50, 51, 60 R, 24

[56] References Cited
UNITED STATES PATENTS
3,641,891  2/1972  Burgarella............................ 354/51
3,733,984  5/1974  Yata ..................................... 354/51
3,849,786  11/1974 Nanba et al. ......................... 354/51

OTHER PUBLICATIONS
"Photodevices Have You in the Dark?", Snyder, *Electronic Design* Feb. 1, 1969, pp. 60–64.

Primary Examiner—L. T. Hix
Assistant Examiner—Russell E. Adams, Jr.
Attorney, Agent, or Firm—Lane, Aitken, Dunner & Ziems

[57] ABSTRACT

An electric shutter circuit is disclosed, which linearly varies the resistance in a bias electric power source for setting exposure factors for an automatic exposure control to thereby adjust the collector current of an electric current controlling transistor in a negative feedback circuit, and which even at the time of the manual exposure time setting, linearly varies the resistance in the bias electric power source for introducing exposure factor and setting the exposure time manually to adjust the collector current in an electric current controlling transistor in the negative feedback circuit. This circuit features that the collector current in an exposure time controlling transistor is equalized to the collector current in the electric-current controlling transistor, so that the trigger level in a comparator detector in a time constant circuit will be maintained constant.

10 Claims, 6 Drawing Figures

ELECTRIC SHUTTER CIRCUIT

BACKGROUND OF THE INVENTION

This invention relates to a single lens reflex electric shutter camera with automatic exposure control and of the storage type, and more particularly to an electric shutter circuit which is an improvement over a manual exposure time setting device.

With the prior art electric shutter used in a single lens reflex electric shutter camera of an automatic exposure control and storage type, either the automatic exposure control or manual exposure time setting or adjustment may be selected by a means of a change-over switch.

In the case of the automatic exposure control, a constant current is linearly charged to a time-constant condenser according to the variation in input from a light receiving element in a light measuring circuit. In the case of the manual exposure time setting, the charging characteristics thereof according to the manual exposure time setting variable resistor is dependent on an exponential function of a set resistance, thus resulting in the failure to operate a comparator detector circuit, with the result that there are provided two trigger level adjusting resistors for switching from an automatic mode to a manual mode and vice versa, followed by the adjustment for each case.

In addition to this, the temperature compensation should be separately carried out for the light measuring circuit for automatic mode and for the time constant circuit for manual mode, with difficulties in integrating the above two circuits.

Still furthermore, the manual exposure time setting variable resistor should be selected in a geometrical series manner. However, such a resistor is costly and of poor accuracy, as compared with the variable resistor, whose resistance varies in an arithmetical series manner.

SUMMARY OF THE INVENTION

It is the first object of the present invention to provide an electric shutter which controls an output current from the controlling transistor by means of an electric current gain adjusting circuit consisting of an exposure factor setting bias electric power source and diodes and which is provided with manual exposure time setting device much less expensive, as compared with the case where there is used as a manual exposure time setting means a variable resistor which serves as an exponential function, and to which is fed the intelligence or exposure values by means of a variable resistor which linearly varies, at the time of the manual exposure time setting.

It is the second object of the present invention to provide an electric shutter circuit which adjusts a charging level by means of an electric current gain adjusting circuit and integrates a light measuring circuit, a trigger level setting resistor, a time constant circuit, etc. to thereby present a compact size electric shutter circuit.

It is the third object of the present invention to provide an electric shutter circuit which facilitates the temperature compensation by integrating a light measuring circuit and a time constant circuit.

It is the fourth object of the present invention to provide an electric shutter circuit which facilitates the adjustment thereof.

It is the fifth object of the present invention to provide an electric shutter circuit which uses in common the exposure factor setting bias electric power source and the manual exposure time setting bias electric power source, thereby simplifying the electric circuit.

DESCRIPTION OF THE PREFERRED EMBODIMENTS

Figure 1:
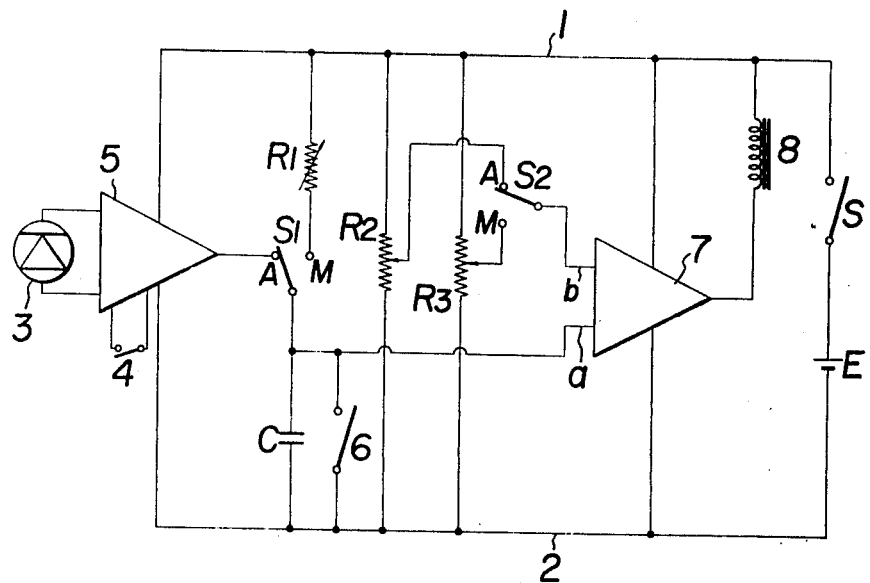
FIG. 1 is an explanatory circuit diagram of an electric shutter circuit provided with a prior art manual exposure time setting device.

For better understanding of the features of the manual exposure time setting device in an electric shutter according to the present invention, description will start with the construction of the prior art electric shutter. The construction of the prior art electric shutter is shown in FIG. 1. As shown, provided between the positive and negative bus bars 1 and 2 are an electric power source E connected in series with a main switch S; a light measuring circuit 5 having a storing condenser operating switch 4 and adapted to receive an input from the light receiving element 3; a time constant condenser C; manual exposure time setting variable resistor R1; automatic mode sliding resistor R2; manual mode sliding resistor R3; change-over switches S1 and S2 from automatic-mode circuit A to a manual mode contact M; a discharging switch 6; comparator detector circuit 7; and a rear curtain operating coil 8. Thus, at the time of the manual exposure time setting, the switches S1 and S2 substitute the manual exposure time setting variable resistor R1 and a manual mode sliding resistor R3 whose resistances are set commensurate to the set exposure time.

Figure 2:
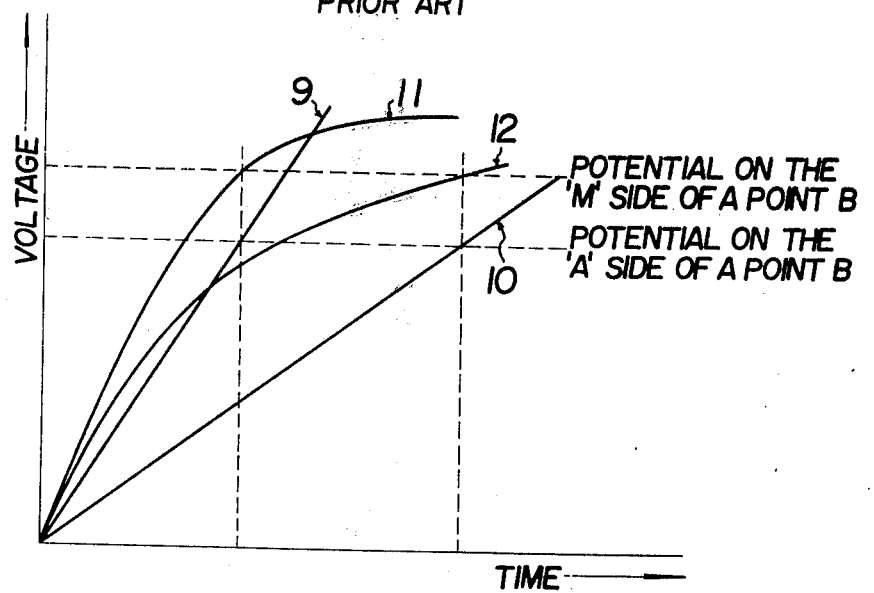
FIG. 2 is a plot showing the charging voltage versus charging time as well as the relationship between the charging characteristic in the case of the prior art automatic exposure control and the charging characteristic in the case of the manual exposure time setting.

The charging characteristics of the time constant condenser C in the case of the automatic mode are shown by straight lines 9 and 10 in FIG. 2 when the light measuring circuit is used. The charging characteristics in the case of the manual mode are shown by exponential function curves 11 and 12 in FIG. 2 when the manual exposure time setting variable resistor R1 is used.

Such a charging characteristic results from the facts that the light measuring circuit charges the time constant condenser with a constant current linearly, due to the variation in the input from the light receiving element 3, and that in the cases of the manual exposure time setting, the current to be charged to the condenser through the variable resistor R1 is not provided as a constant current. As a result, it is impossible to operate the comparator detector circuit 7 at the same trigger level, and thus it is required to use a variable resistor whose resistance varies in a geometrical series manner and to provide two trigger level adjusting resistors, namely, $R_2$ and $R_3$, thus presenting the disadvantage of a need to switch from the automatic mode to the manual mode and vice versa.

In addition to the aforesaid disadvantages, the temperature compensation should be carried out separately with respect to the automatic mode light measuring circuit 5 and the manual mode time constant circuit; however since the change-over switch and variable resistor are connected to both circuits, the two circuits can not be integrated.

Still furthermore, the aforesaid manual exposure time setting variable resistor R1 should be selected in geometrical series manner in response to the exposure time set, and such variable resistor is costly and of poor accuracy as compared with a variable resistor which varies in an arithmetical series manner.

Figure 3:
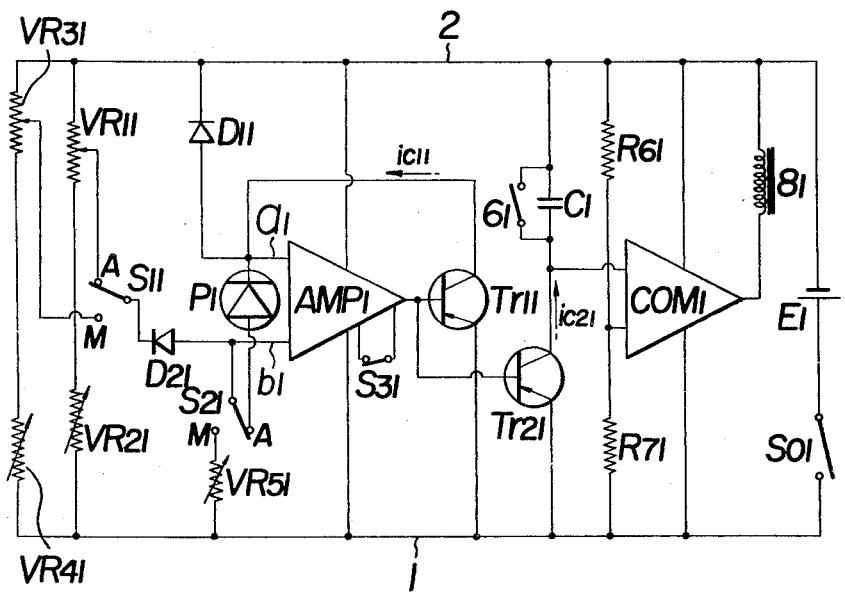
FIG. 3 is a circuit diagram showing the first embodiment of the electric shutter provided with a manual exposure time setting device according to the present invention.

For convenience in correlating the written description with each embodiment of the invention, the reference designations for each element of the same embodiment end in the same digit, e.g., 1 for the first embodiment, shown in FIG. 3. Except for the last digit, corresponding elements in the embodiments bear the same designation.

Referring now to FIG. 3 which shows the first embodiment of the electric shutter provided with the manual exposure time setting device according to the present invention, there are provided between the positive and negative bus bars 1 and 2 an electric power source E1 connected in series with a main switch S01, a sliding resistor VR11 for introducing an automatic mode exposure factor and a variable resistor VR21 for fine adjustment of the output current from the feedback control transistor Tr11 which constitute one bias electric power source; a sliding resistor VR 31 for manual mode and for introducing the exposure factor as well as for setting the exposure time manually and a variable resistor VR41 for the fine adjustment of the output current of the feedback control transistor Tr11, which constitute another bias electric power source; a differential amplifier AMP1 having storage switch S31 an exposure time controlling transistor Tr21; a time constant condenser C1; and series-connected resistors R61 and R71. In addition, there are provided between the positive and negative bus bars 11 and 21 change-over switches S11 and S21 for switching from the automatic mode contact A to the manual mode contact M; a first diode D11; a second diode D21; an adjusting variable resistor VR51; a light measuring element P1; electric current feedback controlling transistor Tr11 of the same specification as that of the aforesaid controlling transistor Tr21; a comparator detector COM1 having one trigger level established by resistors R61 and R71; and a rear curtain operating coil 81. Those components are connected as shown.

For the automatic exposure control, the change-over switches S11 and S21 are connected to the automatic mode contact A, whereby a negative feedback circuit consists of a light receiving element P1, first and second diodes D11 and D21, feedback controlling transistor Tr11, sliding resistor VR11 and variable resistor VR21 constituting the bias electric power source, and differential amplifier AMP1. The input impedance and the gain of the differential amplifier AMP1 are extremely high, and the voltages at the input terminals a1 and b1 will be equalized due to the effect of the negative feedback, presenting the following equation:

$$V_{01} + V_{D21} = V_{D11} \tag{1}$$

wherein $V_{01}$ represents a bias voltage, and $V_{D11}$ and $V_{D21}$ represent voltages at the opposite terminals of (i.e., across each one of) diodes D11 and D21.

The equation (1) may be expressed as follows:

$$V_{01} + K \ln i_{p1}/k = K \ln i_{C11}/k \tag{2}$$

wherein K, k represent constants, $i_{C11}$ represents the collector current of Tr11, and $i_{p1}$ represents the photoelectric current of the light receiving element P1. Rearranging equation (2) results in:

$$V_{01} = K \ln i_{C11}/i_{p1} \tag{3}$$

$$i_{C11}/i_{p1} = e^{V_{01}/K} \tag{4}$$

The equation (4) signifies that the collector current $i_{C11}$ may introduce exposure factor such as diaphragm (aperture) intelligence and film sensitivity and the like by varying bias voltage $V_{01}$ linearly, the aforesaid intelligence being adapted to be proportional to the photoelectric current $i_{p1}$ and to vary in a multiple series manner.

According,
$$V_{01} = i_{01} R_{01} \tag{5}$$

When $i_{01}$ (bias current) or $R_{01}$ (voltage dividing resistance) are varied linearly, e.g., by means of resistor VR11, the multiple series intelligence may be introduced.

While the storing switch S31 is open, the collector current $i_{C11}$ of the feedback controlling transistor Tr11 will continue to flow to the transistor Tr11, and thus the collector current $i_{C11}$ will not be varied, even if the quantity of the light is varied.

On the other hand, the collector current $i_{C21}$ which is equal to or in proportion to the collector current $i_{C11}$ of the controlling transistor Tr11 flows to the collector of the exposure time controlling transistor Tr21 to thereby charge the condenser C1, whereby the comparison and detection of the charging voltage in the condenser with the reference voltage may be effected by means of the comparator detector COM1.

For manual exposure time control, the change-over switches S11 and S21 are switched to the side of the manual mode contact M and then the current i11, substituted for the photoelectric current is supplied from the adjusting variable resistor VR51, while the bias voltage $V_{01}'$, as well will be given from the sliding resistor VR31 and a variable resistor VR41.

Accordingly, $$V_{01}' + V_{VR51} = V_{D11} \tag{1'}$$

wherein $V_{01}'$ represents a bias voltage, $V_{VR51}$ represents voltage across the opposite terminals of the adjusting variable resistor VR51. Accordingly:

$$V_0' + K \ln i11/k = K \ln iC11/k \tag{2'}$$

wherein $l$ represents the electric current of the adjusting variable resistor VR51.

$$V_0' = K \ln iC11/i11 \qquad (3)'$$

$$i_{c11}/i_{11} = e^{V_{01}/K} \qquad (4)'$$

In this case, as well, the same equation applies. (Compare equations (4) and (4)'.) It is thus possible to set the exposure time manually by linearly varying the bias voltage $V_{01}'$ by means of the sliding resistor VR31. The level of the collector current $i_{C11}$ of the feedback controlling transistor Tr11 may be adjusted by means of the variable resistor VR41 and adjusting variable resistor VR51 as in the case of the automatic exposure control, so that the trigger level of the comparator detector COM1 will be maintained constant.

Referring still to FIG. 3, charging is commenced for the condenser C1 by opening the trigger switch 61 at the start of the operation of the forward shutter curtain. When the terminal voltage at the condenser C1 reaches the trigger level which depends on the resistors R61 and R71, then the current to the rear curtain locking solenoid 81 will be interrupted, closing the shutter.

Figure 4:
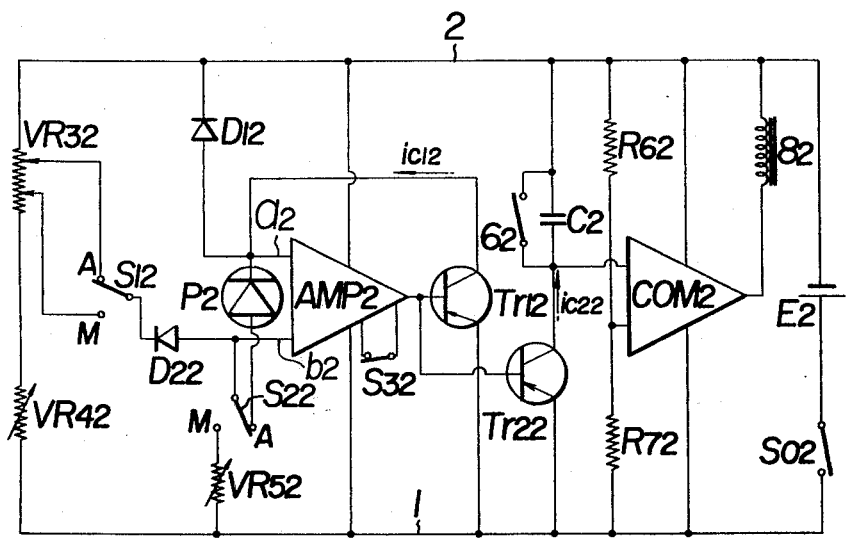
FIG. 4 is a circuit diagram showing the second embodiment of the invention which uses in common the exposure factor setting bias resistor for automatic and manual modes shown in the first embodiment of FIG. 3.

The electric shutter circuit shown in FIG. 4 uses in common the bias resistor for setting the exposure factor and the exposure time manually at the time of the manual mode, and the bias resistor for introducing the exposure factor in the case of the automatic mode shown in the embodiment described thus far, whereby the automatic exposure control as well as the manual exposure time control may be effected by means of the change-over switch which is adapted to be connected and switched to the aforesaid bias resistors.

In this circuit, as well, $$i_{c12}/i_{p2} = e^{V_{02}/K} \text{ or } i_{c12}/i_{12} = e^{V_{02}/K}$$

Figure 5:
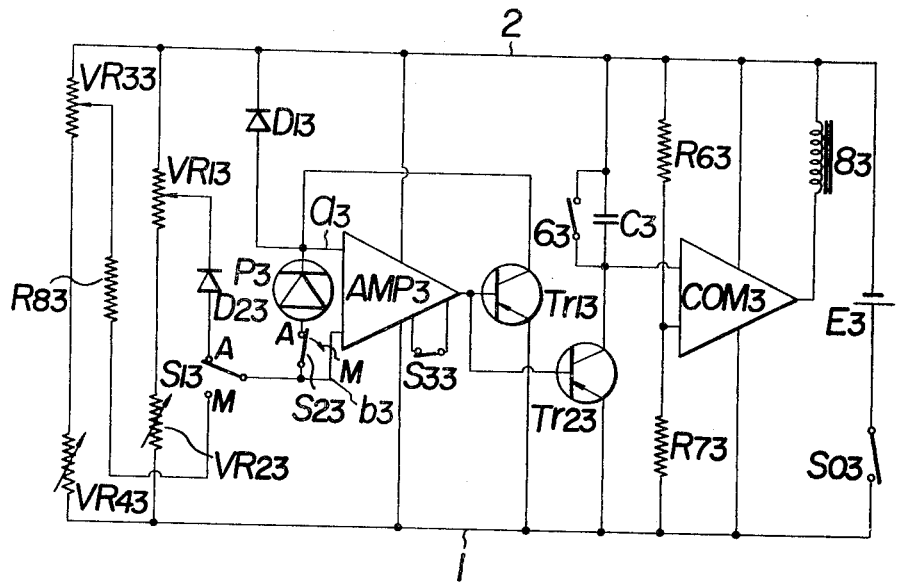
FIG. 5 is a circuit diagram of the third embodiment of the electric shutter provided with the manual exposure time setting device according to the present invention.

The electric shutter circuit shown in FIG. 5 uses the adjusting variable resistor VR51 used in the electric current gain adjusting circuit shown in FIG. 3, in common with the manual exposure time setting variable resistor VR43 and substitutes the resistor R83 for the diode D23 at the time of the manual exposure time setting.

Accordingly, upon automatic exposure control, $$V_{03} + V_{D13} = V_{D23} \qquad (1)''$$

wherein $V_{D23}$ represents voltage across the opposite terminals of diode D23.

The equation may be expressed as follows:

$$V_{03} + K \ln i_{P3}/k = K \ln i_{c13}/k \qquad (2)''$$

$$V_{03} = K \ln i_{c13}/i_{P3} \qquad (3)''$$

$$i_{c13}/i_{P3} = e^{V_{03}/K} \qquad (4)'$$

The equation (4)'' signifies that the collector current $i_{C13}$ is in proportion to the photoelectric current $i_{P3}$ and the exposure factor such as diaphragm (aperture) intelligence and film sensitivity etc. may be introduced merely by linearly varying the bias voltage $V_{03}$.

Accordingly, $$V_{03} = i_{03} R_{03} \qquad (5)''$$

Then, the multiple series intelligence may be introduced by linearly varying $i_{03}$ (bias current) or $R_{03}$ (bleeder resistance).

Upon manual exposure time control, the switches S14 and S23 are all switched to the side of the manual mode contact M, and the bias voltage $V_{03}'$ in place of the bias voltage $V_{03}$ may be given by means of the sliding resistor VR33 and variable resistor VR43, if the variation in voltage due to the resistor R3 is maintained negligible.

$$V_{03}' = V_{D23} \qquad (1)'''$$

The equation (1)''' is expressed as follows:

$$V_{03}' = K \ln i_{c13}/k \qquad (2)'''$$

$$i_{c13} = k e^{V_{03}'/K} \qquad (3)'''$$

This equation (3)''' signifies that the manual exposure time intelligence, which varies in multiple series manner, may be set by merely varying bias voltage $V_{03}'$ linearly. As a result, the manual exposure time setting may be effected by linearly varying the sliding resistor VR33, while the collector current $i_{c13}$ of the feedback controlling transistor Tr13 may be adjusted by means of variable resistor VR43 as in the case with the automatic exposure control, so that the trigger level of the comparator detector COM3 may be maintained constant.

Figure 6:
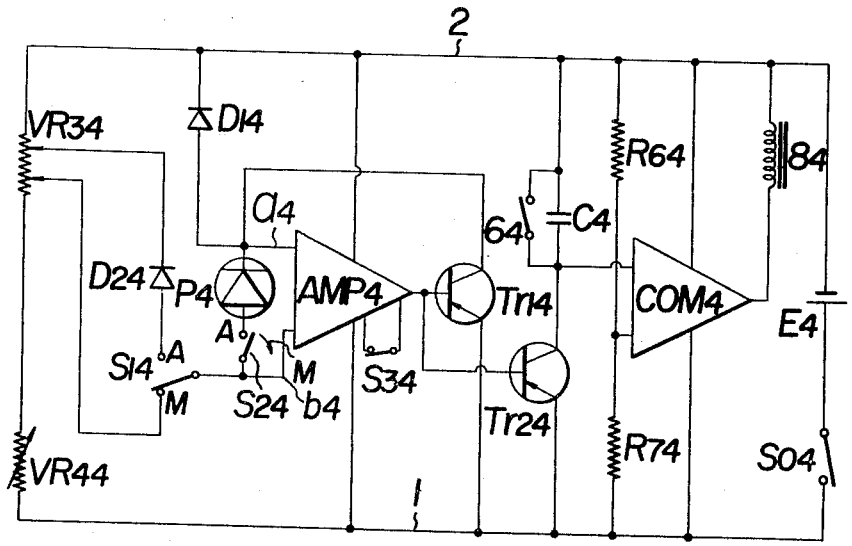
FIG. 6 is a circuit diagram showing the fourth embodiment of the invention which uses in common the exposure factor setting bias resistor for the automatic and manual modes.

The electric shutter circuit shown in FIG. 6 uses in common the bias resistor used in the embodiments described thus far for introducing the exposure factor at the time of automatic mode and the bias resistor used for introducing the intelligence and setting the exposure time manually at the time of the manual mode, whereby the automatic exposure control and the manual exposure time setting control may be effected by means of change-over switches adapted to be switched to the bias resistor. In this embodiment, the following equation will apply.

$$i_{c14}/i_{p4} = e^{V_{04}/K} \text{ or } i_{c14} = e^{V_{04}/K}$$

What is claimed is:

1. An electric shutter circuit with means for setting the exposure time automatically as well as manually, comprising a differential amplifier, a photoelectric element, a negative feedback circuit connected between the output and one of the inputs of said differential amplifier, a first manually variable bias voltage source indicative of the aperture setting, a second manually variable bias voltage source indicative of the exposure time setting, change-over switch means for connecting said first bias voltage source to the other input of said differential amplifier and said photoelectric element across both inputs of said differential amplifier and alternatively for disconnecting said photoelectric element and connecting said second bias voltage source to said other input of said differential amplifier, converter means interconnected with said differential amplifier for causing the current in said feedback circuit to be an exponential function of the output of said second bias voltage source, control means for producing a charging current approximately proportional to the current in said feedback circuit, a capacitive circuit connected to be charged by said charging current, shunt switch means for keeping said capacitive circuit discharged until released, means for releasing said shunt switch means when the shutter is opened to begin the charging of said capacitive circuit, detector means connected to produce a control output indicative of the charging of said capacitive circuit to a predetermined trigger level, means responsive to the control output of said detector means for causing said shutter to close, whereby said shutter remains open for a predetermined interval determined by said first manually variable bias voltage source and said photoelectric element in the case of automatic exposure time setting, and by said second manually variable bias voltage source in the case of manual exposure time setting.

2. The shutter circuit of claim 1, wherein said feedback circuit includes a feedback transistor with a base connected to the output of said differential amplifier and a collector connected back to said one input of said differential amplifier, said control means producing a charging current to said capacitive circuit proportional to the collector current of said feedback transistor.

3. The shutter circuit of claim 2, wherein said control means includes a control transistor operatively connected in parallel with said feedback transistor, the collector current of said control transistor being said charging current.

4. The shutter circuit of claim 1, wherein said first and second bias voltage sources include a common resistive element having respective sliding contacts, said contacts being connectible to said other input of said differential amplifier via said change-over switch means.

5. The shutter circuit of claim 3, wherein said first and second bias voltage sources include a common resistive element having respective sliding contacts, said contacts being connectible to said other input of said differential amplifier via said change-over switch means.

6. The shutter circuit of claim 1, wherein said converter means includes a diode operatively connected between said one input of said differential amplifier and source of fixed voltage.

7. The shutter circuit of claim 1, wherein said second bias voltage source comprises a linearly variable resistance.

8. The shutter circuit of claim 6, further comprising another diode connected with the other input of said differential amplifier and capable of being connected selectively with said first bias voltage source or with said second bias voltage source by said change-over switch means.

9. The shutter circuit of claim 6, further comprising another diode connected with said first bias voltage source and capable of being connected with the other input of said differential amplifier by said change-over switch means.

10. A manually settable electric shutter circuit, comprising a differential amplifier, a negative feedback circuit connected between the output and one of the inputs of said amplifier, an adjustable bias voltage source connected to the other input of said differential amplifier for manually setting the exposure time in time intervals corresponding to a geometrical series, said voltage source including a voltage divider circuit having a linearly variable resistance which varies in intervals corresponding to an arithmetic series, a diode connected between said one input of said amplifier and a source of fixed voltage such that the current in said feedback circuit is an exponential function of the output of said bias voltage source, control means for producing a charging current approximately proportional to the current in said feedback circuit, a capacitive circuit connected to be charged by said charging current, means for beginning the charging of said capacitive circuit when the shutter is opened, detector means connected to produce a control output indicative of the charging of said capacitive circuit to a predetermined trigger level, and means responsive to said control output for automatically causing said shutter to close.

* * * * *

UNITED STATES PATENT OFFICE
CERTIFICATE OF CORRECTION

Patent No. 3,968,502                    Dated July 6, 1976

Inventor(s)  Shiozawa et al

It is certified that error appears in the above-identified patent and that said Letters Patent are hereby corrected as shown below:

On the cover page 1, under "Assignee:" the assignee should be given as --Konishiroku Photo Industry Co.,Ltd.,Tokyo, Japan and Matsuskita Electric Industrial Co., Ltd., Osaka, Japan.--

Signed and Sealed this

Twenty-eighth Day of June 1977

[SEAL]

Attest:

RUTH C. MASON
Attesting Officer

C. MARSHALL DANN
Commissioner of Patents and Trademarks